United States Patent Office 2,764,239
Patented Sept. 25, 1956

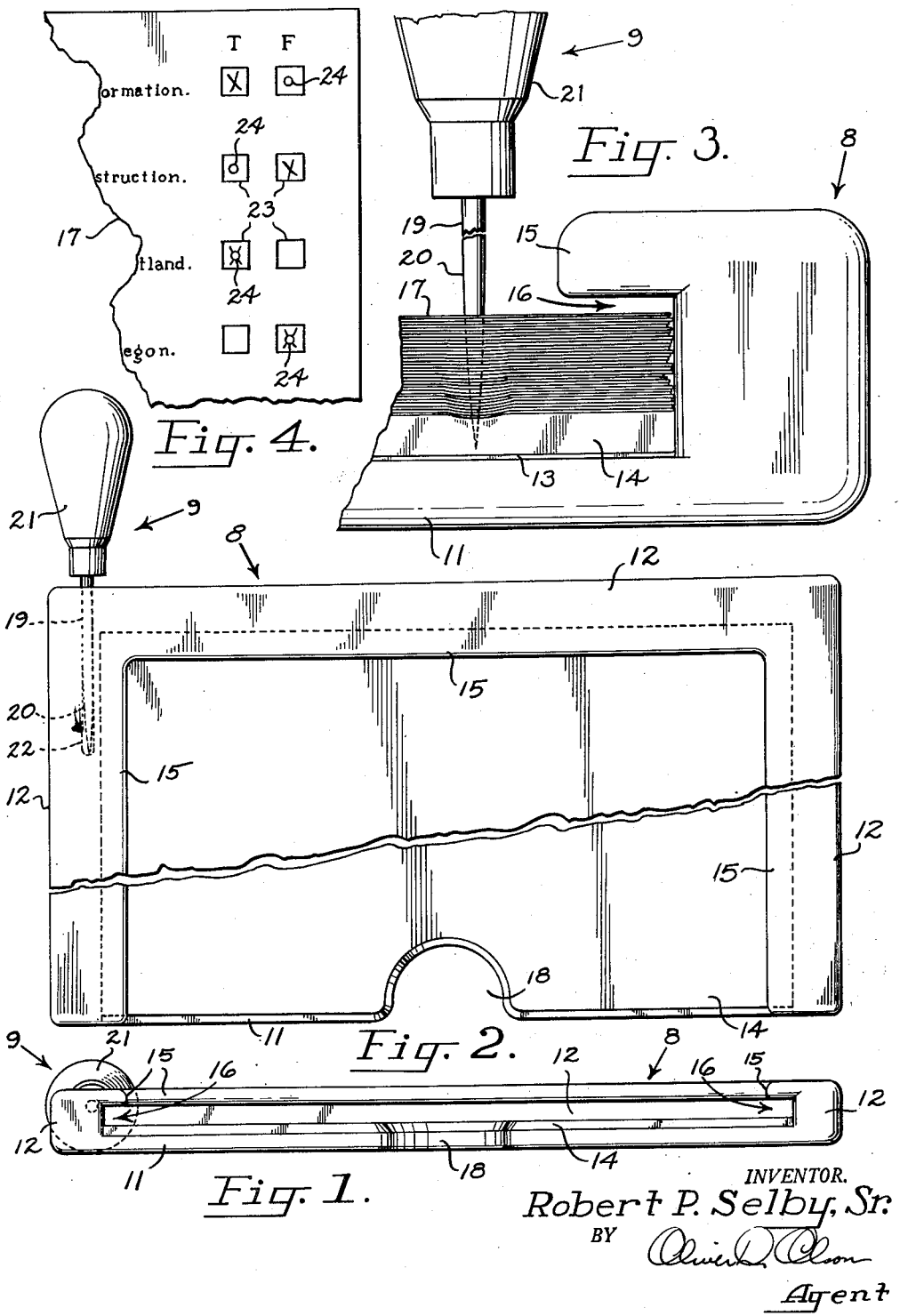

2,764,239
TEST SCORING DEVICE

Robert P. Selby, Sr., Portland, Oreg., assignor to Marx-All Corporation, a corporation of Oregon Application March 11, 1953, Serial No. 341,677

1 Claim. (Cl. 164—86)

This invention pertains to test scoring devices, and relates particularly to a simplified device by which a plurality of test papers may be marked simultaneously for scoring.

It has long been the accepted practice in the teaching profession for teachers to delegate to themselves the task of scoring the test papers of their own students and, moreover, to laboriously score each test paper separately. The single advantage of this procedure resides in the opportunity afforded the teacher for interpretation and diagnosis simultaneously with the scoring of each paper. However, this procedure imposes many additional hours of tedious labor, usually at the expense of well-deserved rest. This disadvantage has been overcome in part with the advent of standardized tests adapted to be scored by machine. On the other hand, however, the luxury of such complex and expensive machines is afforded only to a relatively few large schools. In addition, the serious disadvantage of machine-scored tests resides in the fact that, since only the total score on a test is registered, i. e. the machine does not indicate which test questions were answered correctly and incorrectly, the opportunity for interpretation and diagnosis is not available to the teacher.

It is the primary object of the present invention, therefore, to provide a device by which a teacher or someone delegated by the teacher may score a plurality of test papers simultaneously with maximum efficiency and facility.

Another important object of this invention is the provision of a test scoring device by which a plurality of test papers may be scored simultaneously by a person who does not have to know the correct answers to the test questions, thereby relieving the teacher of the burden of scoring the tests.

A further important object of this invention is to provide a test scoring device by which a plurality of test papers may be scored simultaneously and by means of which each test sheet is physically marked to afford subsequent interpretation and diagnosis.

A still further object of the present invention is the provision of a test scoring device which is of simplified and therefore economical construction and which is capable of extended and repeated use without maintenance or repair.

The foregoing and other objects and advantages of this invention will appear from the following detailed description taken in connection with the accompanying drawing, in which:

Figure 1 is a view in front elevation showing a test scoring device embodying the features of the present invention;

Figure 2 is a foreshortened top plan view of the test scoring device shown in Figure 1;

Figure 3 is a fragmentary enlarged view in front elevation of the device shown in the preceding views and illustrating the manner in which the scoring operation is performed; and Figure 4 is a fragmentary plan view of a test paper, the same being shown subsequent to being scored by means of the scoring device of this invention.

The scoring device of the present invention is of utility in scoring objective tests of the type in which the student indicates his answers to the questions by making one or more marks in appropriate boxes or at otherwise specified locations on the test paper. The well-known true-false type of test illustrated in Figure 4 of the drawing is an example. Another example is the multiple choice type of test wherein a plurality of alternative answers are given and one or more of them may be correct answers. Still another example is the type of achievement or intelligence tests designed to be scored by machine. This latter type may be scored by means of the device of the present invention, thereby overcoming the disadvantages of expense and loss of the important factor of interpretation and diagnosis attending the use of such machines.

Referring to the drawing, the test scoring device of the present invention comprises a test paper holder indicated generally by the numeral 8 and a sharp pointed punch identified by numeral 9. The paper holder comprises a rectangular base member 11 bounded on three sides by upstanding walls 12. Mounted upon the upper surface of base member 12 and preferably secured thereto, as by gluing 13, is a layer of resilient material 14, such as sponge or other type of rubber, cork, felt, or other substance suitable to accommodate the operation described in detail hereinafter. An inwardly projecting flange 15 is provided adjacent the upper edge of the side walls to form an edge groove 16 bounded by the elements 15, 12, 14. The elements 11, 12, 15 may be made of wood, metal or plastic.

The front side of the holder is open to accommodate the insertion of a plurality of test papers 17 (Figure 3) onto the resilient layer 14, the edges of the test papers being confined within the marginal grooves 16. The base member 11 and resilient layer 14 are cut away centrally of their front edges to provide a finger notch 18 (Figures 1 and 2) by which to facilitate the removal of the test papers from the holder subsequent to scoring.

The punch 9 is of well-known type, comprising a metal rod 19 tapered at one end to a sharp point 20 and secured at the opposite end to a handle 21. An elongated hole 22 is provided in one of the side walls 12 to receive the punch rod 19 frictionally therein for convenience in storing the punch when not in use.

It is preferred that the tapered section of the punch point 20 extend for a length at least equal to the distance between the under side of the flange 15 and the upper surface of base member 11. This length of paper facilitates the penetration of the combined thickness of the maximum number of test papers accommodated within the grooves 16 and the thickness of the resilient layer 14.

The important function performed by the resilient layer is illustrated in Figure 3, wherein the punch point 20 is shown penetrating a substantial thickness of test papers 17. It is to be observed that as the punch point is forced downwardly through the stack of papers a substantial number of the lowermost papers are indented downwardly, the magnitude of the indentation increasing progressively toward the lowermost paper. This indentation is permitted by the resilient layer 14, which is also indented, and it is this indentation of the lower number of papers that produces a larger area of rupture in those papers than is achieved when the punch point penetrates a flat sheet of paper. Thus, whereas the puncture of the lower sheets of paper by the end of punch point 20 would otherwise be so small as to be impractical for the purpose of a visual score mark, the provision of resilient layer 14 results in the production of puncture marks many times greater in size than the cross sectional area of the punch point. These puncture marks are as easily observed on test papers as are the puncture marks produced in the test papers at the top of the stack.

The resilient layer 14 performs the additional important function of receiving a length of the punch point 20 through its thickness and to then recover its original flat surface when the punch point is withdrawn. In this manner the surface upon which the test papers are deposited for scoring is always even, and the scoring device may be used repeatedly without replacement or repair. Furthermore, the punch may penetrate the resilient layer 14 in any area, thereby accommodating the scoring of many types of test papers, regardless of the position of the answer boxes on said papers. In this respect it is seen that the scoring device is most universal in its application.

The preferred dimensional construction of the test scoring device described hereinbefore is as follows: The distance between the side grooves 16 is slightly greater than eleven inches and the distance between the back groove 16 and the front edge of the base member 11 and resilient layer 14 is preferably at least eleven inches. This construction accommodates the various conventional sizes of test papers 17, which are 11 inches in one dimension and vary in general from 8½ to 11 inches in the other dimension. These two sizes represent a substantial majority of the test papers in common use. The thickness of the resilient layer 14 is preferably about one-eighth inch, and the vertical height of the grooves 16 above the resilient layer is about one-quarter inch.

The preferred use and operation of the test scoring device described hereinbefore is as follows: The group of identical test papers 17 to be scored is arranged in a stack, with all papers facing in the same direction, whereby the answer boxes 23 are all disposed in cooperative registration. The stack of papers is then inserted along the side grooves 16 and moved rearwardly over the resilient layer into abutment with the back groove.

In the event the scoring is done by the teacher, provision of a master sheet, i. e. a test paper having all the correct answers properly marked, is not required. However, if the scoring is delegated to someone who may not know the correct answers, a master sheet is placed at the top of the stack. In either case the person scoring the papers pushes the punch point 20 through each of the answer boxes indicating the correct answers. Thus, for example, in Figure 4, certain answer boxes are shown marked by a student with an X to indicate his answer to each test question. The perforations 24, made simultaneously through all of the test papers, indicate the correct answers. Accordingly, after the entire group of papers have been punch scored it is only necessary to tally the number of boxes which contain both the student's X mark and the scorer's perforation 24 in order to arrive at the test grade for each paper. This may be done by the scorer if so delegated by the teacher, or the teacher may tally the score while simultaneously studying each paper for purposes of interpretation and diagnosis.

From the foregoing description it is believed to be apparent that the present invention provides an efficient and inexpensive means by which to score test papers with maximum speed and facility. By the use of this device a plurality of test papers may be scored simultaneously and by unskilled persons delegated by the teacher. The device may be used to score various types of objective tests and it accommodates papers of conventional sizes. The device is compact and easily portable, and may be used indefinitely without repair or replacement.

It will be apparent to those skilled in the art that various changes may be made in the size and structural details of the device without departing from the scope and spirit of the present invention. Accordingly, it is to be understood that the foregoing description is illustrative and is not to be considered in a limiting sense.

Having now described my invention and the manner in which the same may be used, what I claim as new and desire to secure by Letters Patent is:

A device for the mass scoring of a plurality of superimposed test papers by perforating the latter at random locations, comprising, in combination with a hand punch having a pointed end adapted by hand pressure to penetrate and tear holes in a plurality of superimposed test papers, an imperforate base member resistive to penetration by the punch and bounded on three sides by upstanding walls, a layer of resilient material overlying the base member within the confines of the said walls and forming a resilient support for the test papers, whereby to permit penetration of the latter by the punch at random locations over the entire area of the resilient material, the resilient material being characterized by being readily penetrated by the punch and recoverable substantially to its original condition upon removal of the punch therefrom.

References Cited in the file of this patent
UNITED STATES PATENTS

| | | |
|---|---|---|
| 223,676 | Kelly | Jan. 20, 1880 |
| 714,310 | Laws | Nov. 25, 1902 |
| 1,147,817 | Samson et al. | July 27, 1915 |
| 1,289,861 | Mills | Dec. 31, 1918 |
| 1,501,919 | Peters | July 22, 1924 |
| 1,541,078 | Sudweeks | June 9, 1925 |
| 1,644,160 | Thompson | Oct. 4, 1927 |
| 1,713,147 | Ruze | May 14, 1929 |
| 1,799,374 | Hurley | Apr. 7, 1931 |
| 1,871,597 | English | Aug. 16, 1932 |
| 2,068,037 | Osborn | Jan. 19, 1937 |
| 2,142,419 | Strongman | Jan. 3, 1939 |
| 2,149,913 | Gilpin | Mar. 7, 1939 |
| 2,264,474 | Lang | Dec. 2, 1941 |
| 2,520,367 | Lafforthun | Aug. 29, 1950 |